United States Patent [19]

Wisecarver

[11] Patent Number: 4,473,331

[45] Date of Patent: Sep. 25, 1984

[54] CARGO SHORING BRACE EXTENSIBLE FOOT ASSEMBLY

[75] Inventor: Martin L. Wisecarver, Sonora, Calif.

[73] Assignee: Bishop-Wisecarver Corporation, Pittsburg, Calif.

[21] Appl. No.: 380,094

[22] Filed: May 20, 1982

[51] Int. Cl.$^3$ .................. B60P 7/14; B61D 45/00; B63B 25/24

[52] U.S. Cl. ................... 410/129; 410/140; 410/143; 410/145; 410/151; 410/152

[58] Field of Search .............. 410/129, 143, 145, 151, 410/152, 140

[56] References Cited

U.S. PATENT DOCUMENTS

| | | | |
|---|---|---|---|
| 1,951,660 | 3/1934 | Klaudt | 410/145 X |
| 2,411,768 | 11/1946 | Welch | 410/151 |
| 2,414,160 | 1/1947 | Moon | 410/151 |
| 2,766,704 | 10/1956 | McMahon | 410/151 |
| 3,049,328 | 8/1962 | Bishop | 410/151 X |
| 3,171,627 | 3/1965 | Tapley et al. | 410/151 X |
| 3,329,388 | 7/1967 | Barber | 410/151 X |
| 3,880,394 | 4/1975 | Wisecarver | 410/151 X |
| 4,396,325 | 8/1983 | Joice-Cavanagh | 410/129 |

*Primary Examiner*—Howard Beltran

*Attorney, Agent, or Firm*—Manfred M. Warren; Robert B. Chickering; Glen R. Grunewald

[57] ABSTRACT

A cargo shoring device and foot assembly therefor is disclosed. The foot assembly includes a body formed for mounting to a cargo support member, an extensible element movably mounted to the body and carrying a wall engaging foot portion, manually engageable pivotally mounted lever formed and coupled for extension and retraction of the extensible element upon rotation of the lever and a latch element formed in the body to engage the lever when rotated to a position extending the extensible element. By the lever is mounted for movement into and out of engagement with the latch element by manipulating the lever laterally of the plane of rotation of the lever in order to enable manipulation of the lever by one hand of the operator to effect extension of the foot portion, latching and unlatching of the lever and retraction of the foot portion. A quick-mount is also disclosed which includes a movable lever having an engagement portion, preferably in the form of a prong, which can be moved into engagement with and released from the cargo support member. A latch for latching the quick-mount lever in the engaged position with the body of the cargo support member is also provided.

29 Claims, 10 Drawing Figures

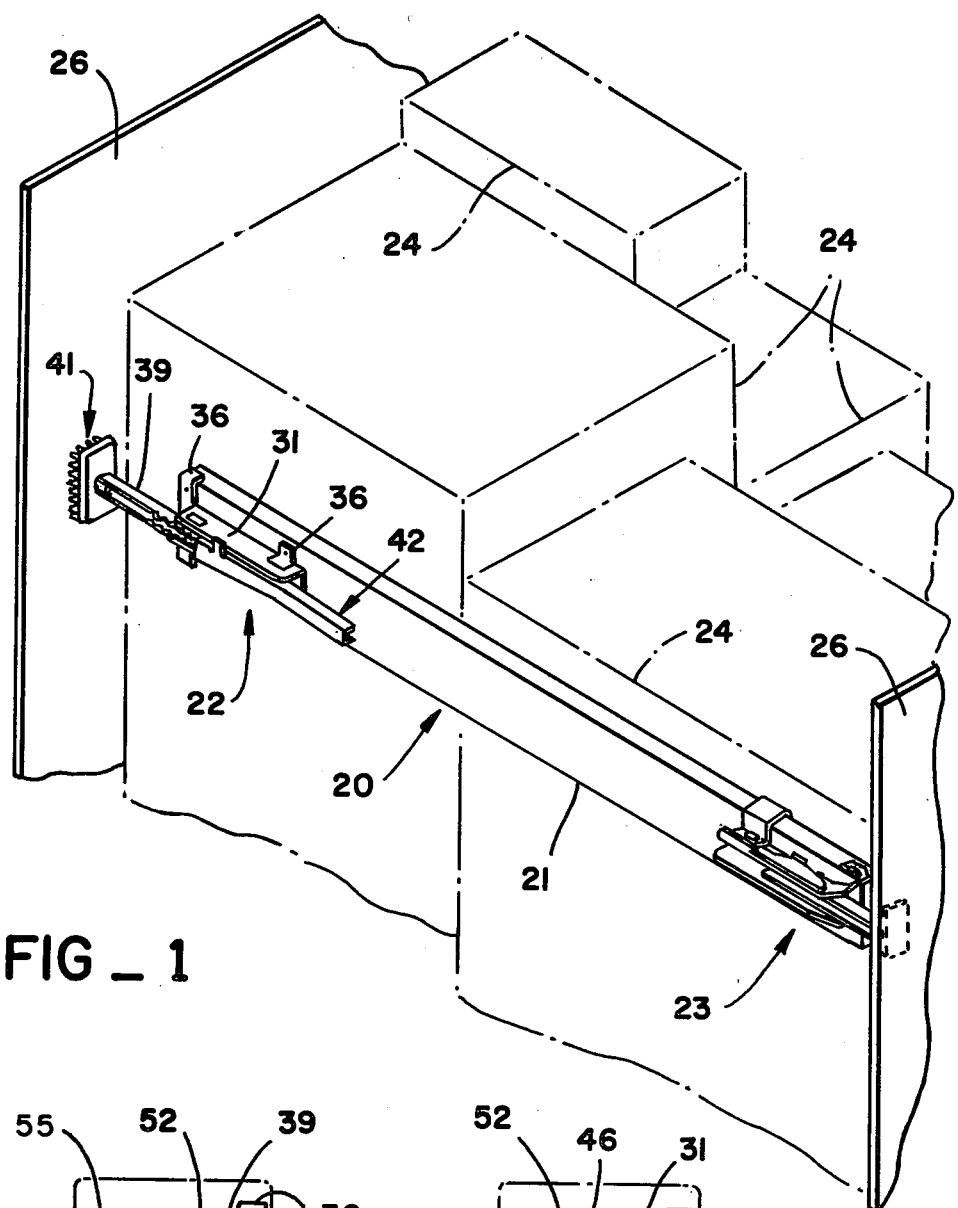
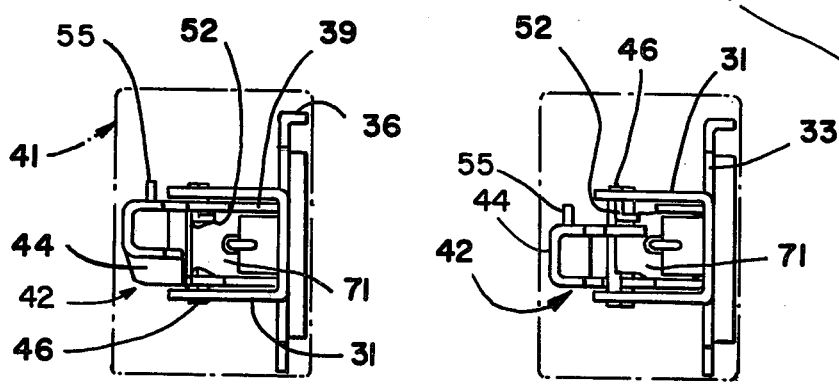

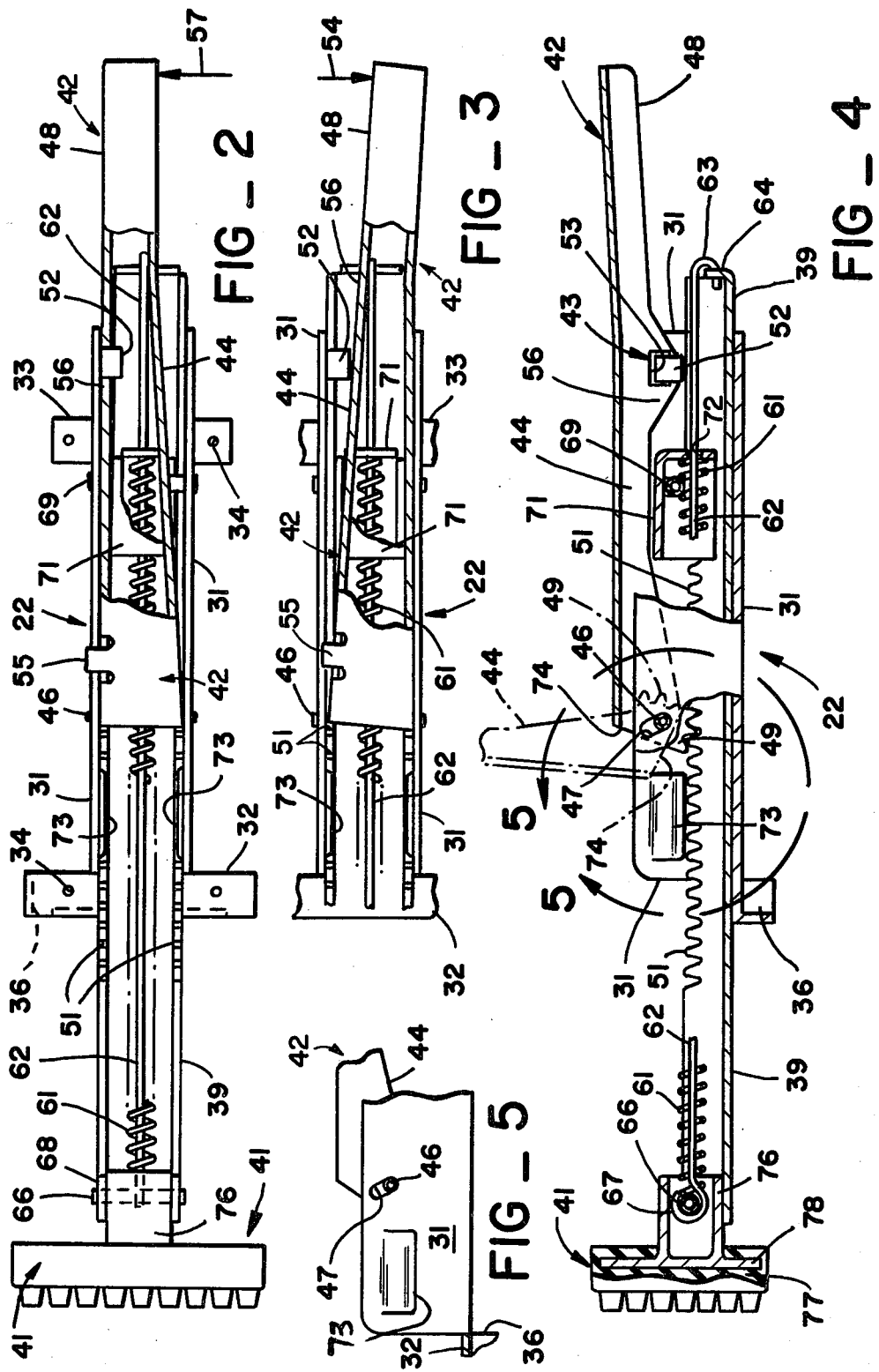

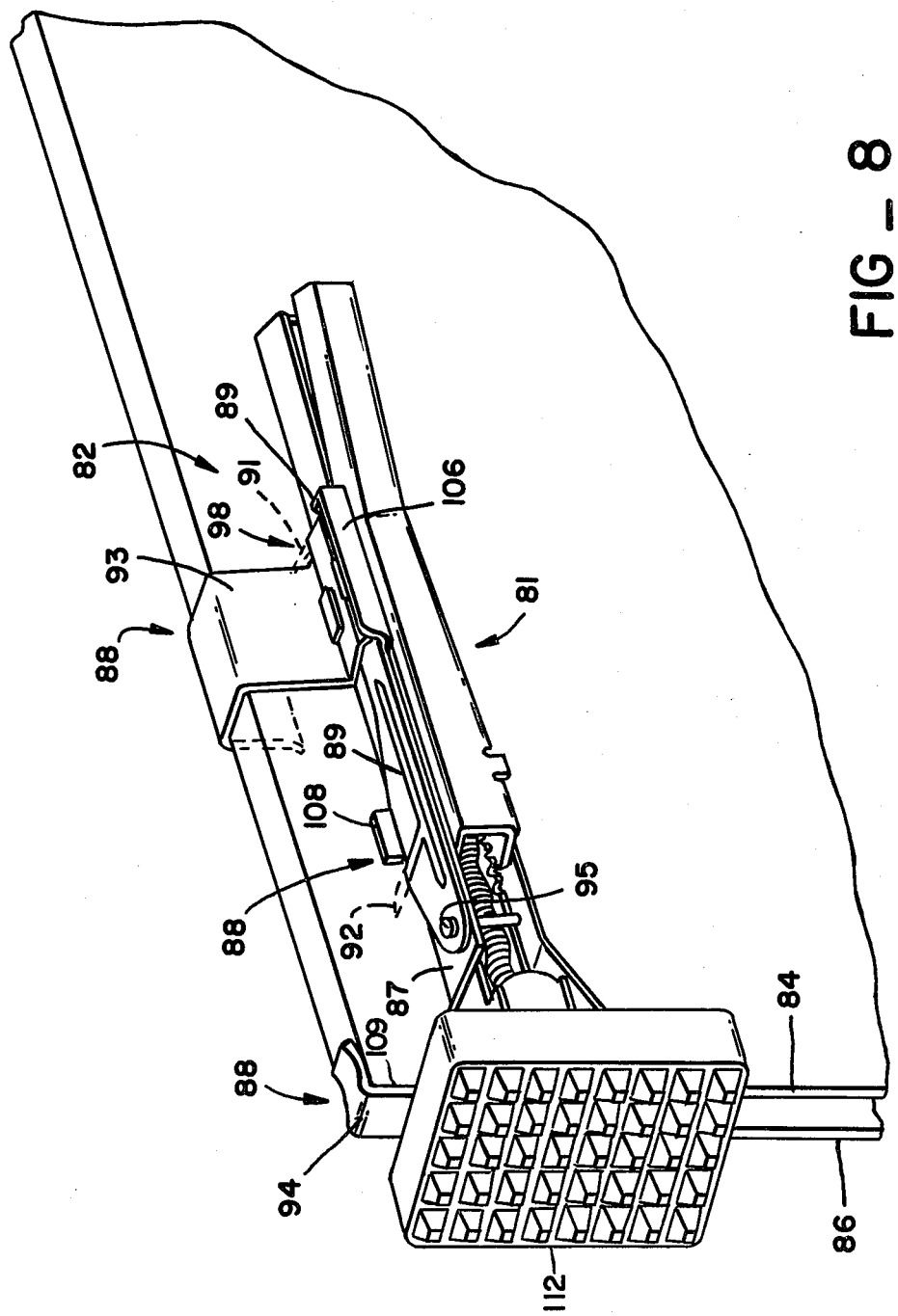

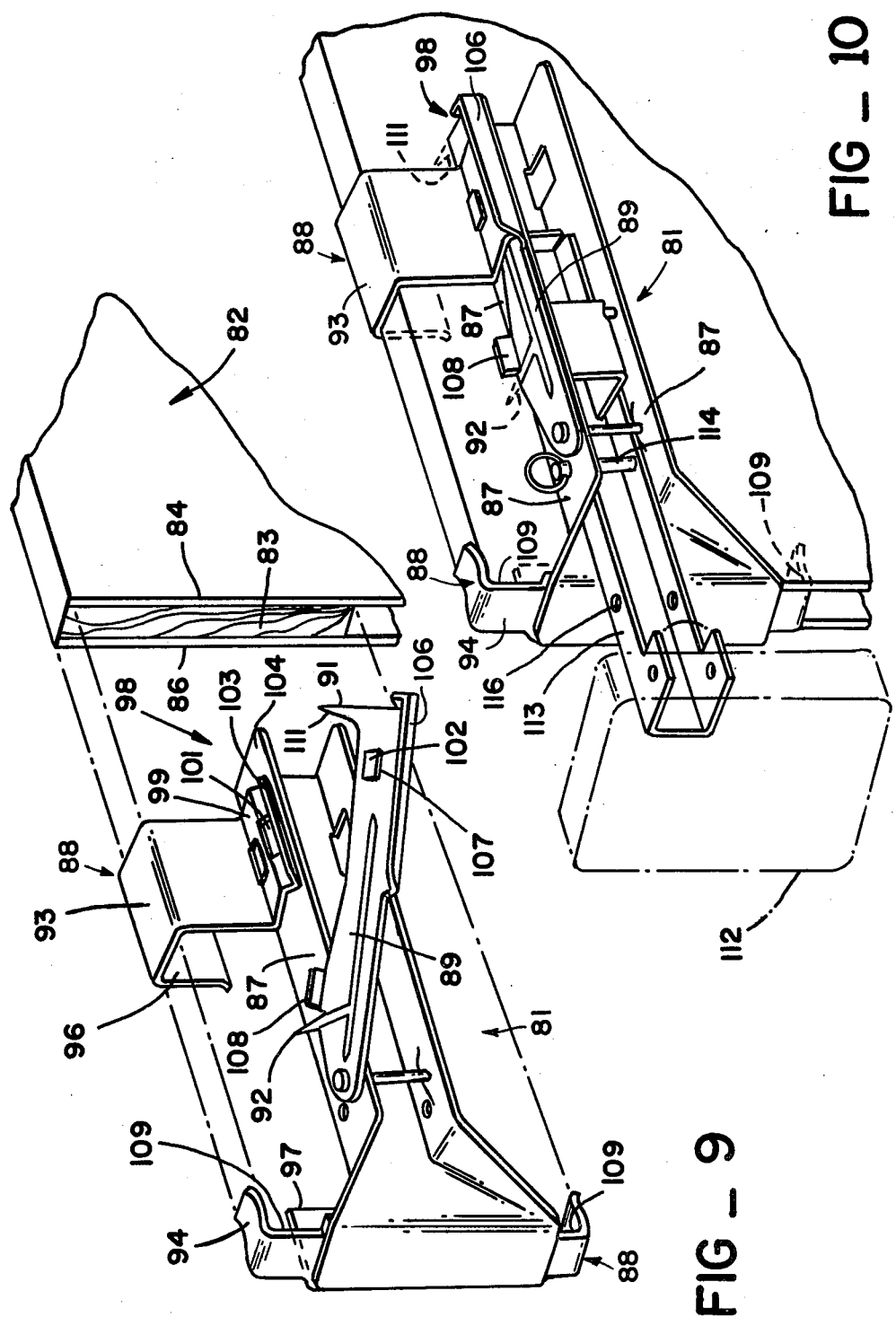

CARGO SHORING BRACE EXTENSIBLE FOOT ASSEMBLY

BACKGROUND OF THE INVENTION

The shoring or bracing of cargo in transportation containers by means of cargo shoring beams or bars is extensively employed in the trucking, railroad and other transportation industries. Truckers, for example, having a partial truckload will use a cargo shoring bar to span across between the inside walls of the truck trailer immediately adjacent to and abutting the partial load. Several bars are typically employed and secure the load against shifting during transit.

Cargo shoring devices are constructed with a foot assembly on each end thereof which either frictionally engages the cargo container wall or interfits or hooks into a track or series of openings provided in the wall. The track-type cargo shoring devices have the disadvantage of requiring a wall-mounted structure, which inherently places certain limitations on the ability to position the shoring bar. There are other disadvantages to the track-type shoring device. Another common approach to shoring or bracing cargo is to employ a cargo bracing device which is extensible between opposed walls of the cargo container and formed to frictionally engage the walls and thereby hold the carbo bracing device in place. Such extensible, friction-based, cargo-bracing devices can be positioned virtually anywhere in the cargo container, including positioning so as to brace between the floor and ceiling.

Typical of cargo-bracing devices which include an extensible element that is advanced by relative rotation of interengaged threaded elements are the devices disclosed in U.S. Pat. Nos. 1,951,660; 3,171,627; 3,329,388 and 3,880,394. These apparatus are well suited for some applications but can be difficult for the operator to manipulate in other applications. The device of U.S. Pat. No. 3,049,328 has been widely used in industry and includes a bar having a fixed foot assembly on one end and a moveable foot assembly on the other. The bar is positioned between opposed walls of the cargo container and a lever used to extend the moveable end of the bar outwardly against the walls. The walls will flex somewhat under the axial force generated by extension of the bar, and the bar will be frictionally bound between the walls in a snug position proximate the cargo. The assembly includes a latch so as to hold the lever and the extensible portion of the bar in the extended position.

While cargo shoring devices constructed in accordance with U.S. Pat. No. 3,049,328 have been found to have many substantial advantages, certain disadvantages have been encountered. As will be appreciated, it is essential that a cargo shoring bar be positioned as closely to the cargo as possible, and preferably abutting the same. Such cargo shoring bars are typically about 7½ feet (2.3 meters) long and weigh about 10 to 15 lbs. (4.5 to 7.4 kilograms). Very often, positioning of the bar against the load also requires that the load be held back during placement of the bar. Moreover, when the bar is to be removed, it is not unusual for the load to have shifted in a manner which requires it to be supported during removal of the bar. Manipulation of cargo shoring bars during placement and removal of the same, therefore, poses substantial problems. It is preferable, therefore, to be able to place and remove the shoring device with one hand so that the other hand can be used to support the load during the installation and removal processes. Since the opposed walls of a cargo container act as a large spring, unlatching cargo bars constructed as shown in U.S. Pat. No. 3,049,328 is a two-handed process if one is to avoid snapping back of the lever and dropping of the bar to the floor of the container.

As will be appreciated, cargo shoring beams or bars can, over a period of time, become bent or damaged by shifting loads and the like to a point which is beyond their repair by simply attempting to straighten out the bar. In most cases, such damage requires that the bar be discarded, which can be a significant economic loss when considering the number of cargo shoring bars in use and periodically damaged beyond repair.

In addition to the use of bar- or beam-type cargo shoring devices, there is a need for cargo shoring devices which are partitions or moveable walls that can be mounted in a cargo container, particularly to shore up relatively small articles. For cargo shoring partitions, the problems of manipulation of the partition during placement are even greater than for bars, and there similarly is a substantial need to be able to accommodate cargo containers of varying widths and heights. As is the case with cargo shoring bars, cargo shoring partitions will periodically become damaged beyond repair, and they are preferably formed so that the economic loss when such damage occurs is minimized.

OBJECTS OF THE INVENTION

Accordingly, it is an object of the present invention to provide a cargo shoring device and a foot assembly therefor which is constructed in a manner that makes it easier to position the device against cargo for shoring of the same and to remove the device.

Another object of the present invention is to provide a foot assembly for mounting to a cargo support member to form a cargo shoring device which foot assembly may be easily and quickly mounted to and removed from the support member.

Another object of the present invention is to provide a foot assembly for the formation of a cargo shoring device which can be used to secure and brace a multiplicity of small packages or items.

Still another object of the present invention is to provide an extensible foot assembly for formation of a cargo-supporting device which can be easily operated by one hand during placement and removal of the shoring device.

Still a further object of the present invention is to provide a foot assembly for a cargo shoring device which can be used with beam-like members and partitions.

Another object of the present invention is to provide a foot assembly for mounting to a cargo support member which will minimize the economic loss in the event of damage of the cargo support member.

Another object of the present invention is to provide a cargo shoring device and foot assembly therefor which is durable, may be mounted to a cargo support member without the use of specialized tools, is economical to manufacture, is adaptable for use with a wide range of different cargo support members, and may be used by relatively unskilled personnel.

SUMMARY OF THE INVENTION

The foot assembly of the present invention is formed for mounting to a cargo support member, such as a bar or partition, in order to form a shoring device for the support of cargo in a container. In one aspect of the present invention the foot assembly includes a body formed for mounting to the cargo support member, an extensible element moveably mounted to the body and carrying a wall-engaging portion, a manually engageable displacement assembly formed and coupled for a extension and retraction of the extensible element, and a latch assembly formed to releasably latch the extensible element in an extended position. The improvement in the foot assembly comprises, briefly, the displacement assembly and latch assembly being cooperatively formed for manipulation by one hand of the user to enable extension of the extensible element against resistance upon engagement with the container wall, latching of the extensible element in the extended position, release of the latch assembly for retraction of the extensible element, and retraction of the extensible element to permit removal of the shoring device. Preferably the displacement assembly is formed as a lever which can be moved laterally as well as pivoted in order to effect cooperative inter-engagement with and disengagement from the latch.

In another aspect of the present invention the foot assembly includes a mounting assembly formed for removable mounting of the foot assembly to the cargo support member. The improvement in this form of the foot assembly is comprised, briefly, of the mounting assembly including a moveable lever assembly having a prong portion and being moveable between an engaged position and a released position with the mounting assembly being further formed to cooperate with the prong portion to interlock the foot assembly to the cargo support member upon movement of the lever to the engaged position. In the preferred form of this foot assembly, the prong portion has a sharpened end so that it can be driven into wooden or synthetic cargo support members, such as 2×4 beams, wood-based and plastic or synthetic-based partitions. In a final aspect of the present invention, a process for formation of an extensible foot assembly for a cargo shoring device or the like is disclosed in which mounting of a plurality of elements in the extensible foot assembly is accomplished by urging transversely extending roll pins substantially simultaneously between the plurality of components of the assembly to lock the same together for pivotal and reciprocal motion.

DESCRIPTION OF THE DRAWING

FIG. 1 is a top perspective view of a cargo shoring device including a foot assembly constructed in accordance with the present invention.

FIG. 2 is a top plan view, partially broken away, of the foot assembly of FIG. 1.

FIG. 3 is a fragmentary, top plan view, partially broken away, corresponding to FIG. 2 but in a moved position.

FIG. 4 is a side elevational view in cross-section of the foot assembly of FIGS. 2 and 3.

FIG. 5 is an enlarged, fragmentary, side-elevational view of the area bounded by line 5—5 in FIG. 4, but showing the outside wall elminated in the cross-section of FIG. 4.

FIG. 6 is an end elevational view of the foot assembly as shown in FIG. 2.

FIG. 7 is an end elevational view of the foot assembly as shown in FIG. 3.

FIG. 8 is a top perspective view of an alternative embodiment of a cargo shoring device and foot assembly constructed in accordance with the present invention.

FIG. 9 is an exploded top perspective view of the mounting base for the foot assembly of FIG. 8.

FIG. 10 is a top perspective view of the mounting base of FIG. 9 with a stationery foot element mounted therein.

DESCRIPTION OF THE PREFERRED EMBODIMENTS

Conventionally, cargo shoring devices have been formed as a single unit in which the foot portions or assemblies are integrally formed with or mounted to the body portion of the device. Typical of such structures are U.S. Pat. Nos. 3,049,328 and 3,880,394. In both of these devices the wall engaging foot portion of the bracing device is essentially permanently mounted to the body of the device, which is shown as a bar or rod.

As may be seen in FIG. 1, cargo shoring device 20 of the present invention is preferably formed with a central cargo support member 21 (either a beam or a partition) to which foot assemblies, generally designated 22 and 23, have been removably attached. While substantial advantages accrue from the ability to removably secure foot assemblies to a cargo support member, it will be understood that the advantages of latching arrangement of the present invention would accrue if the foot assembly of the present invention were incorporated into or permanently secured on a cargo support member, as heretofore had been common in the art.

A plurality of cargo boxes 24 is shown in FIG. 1 positioned inside a cargo transport container having side walls 26. Cargo supporting device 20 spans between walls 26 with at least one of the foot assemblies, in this case assembly 22, being extensible so as to enable the user to secure the shoring device between the opposed walls by increasing the overall length of shoring device 20 until it binds between walls 26. Preferably the shoring device is positioned in a butting relation to boxes or packages 24 before extensible foot assembly 22 is used to bind the shoring device in place.

As will be appreciated, the positioning and securement of shoring device 20 in close proximity to cargo members 24 can pose a substantial problem in terms of the simultaneous manipulation of the shoring device and restraint of the cargo. Thus, cargo shoring device 20 should be formed in a manner which facilitates placement against the cargo, extension of a foot against the container wall, latching of the assembly in an extended position, and reversal of the process when the cargo supporting device is to be removed. Removal, in fact, can pose even greater problems in terms of supporting the cargo boxes during removal of the shoring device because the load often will have shifted to at least some small degree and may be bearing upon the shoring device. Upon release of the support of the shoring device, therefore, the load may shift further.

Referring to FIGS. 2 through 7, the details of construction of the extensible foot assembly and cargo shoring device of the present invention can be set forth. The foot assembly includes a body portion 31 formed for mounting to cargo support member 21. As illustrated in the drawing, the foot assembly body portion includes a pair of laterally extending bracket portions 32 and 33 formed with openings 34 and preferably downwardly depending flanges 36, which can also have openings therein. Fasteners, such as wood screws, can be positioned through openings 34 so as to secure the foot assembly to cargo support member 21, which is shown in FIG. 1 as a wooden beam or piece of lumber such as a 2×4 but can also be a partition, as shown in FIG. 8. Slidably mounted in body 31 is an extensible element or member 39 which carries a wall engaging foot portion, generally designated 41, proximate the distal end thereof. The foot assembly further includes manually engagable displacement assembly, generally designated 42, formed and coupled for extension and retraction of extensible element 39. Finally, latch assembly, generally designated 43 (FIG. 4), is provided for releasably latching displacement assembly 42, and thus extensible element 39, in an extended position.

As thus far described, the foot assembly of the present invention contains elements which are broadly present in prior art devices, such as U.S. Pat. No. 3,049,328. In the improved foot assembly, however, displacement assembly 42 and latch assembly 43 are cooperatively formed for manipulation by one hand of the user to enable extension of extensible element 39 against resistance from container wall 26, latching of the extensible element in the extended position, release of latch assembly 43 for retraction of the extensible element, and controlled retraction of extensible element 39 to permit removal of the shoring device from between walls 26. Formation of displacement assembly 42 and latch assembly 43 for a one-handed operation frees the user's other hand to support packages or boxes 24, or to assist in shifting the position of cargo support device 20, or to support the device during the placement and removal processes.

The extensible element displacement assembly 42 is preferably formed as lever 44 pivotally mounted by pivot pin 46 to the side walls of body portion 31, which preferably has a U-shaped cross-section. Pivot pin 46 is preferably a roll pin which has been driven laterally in through a pair of openings in opposite sides of handle 44, which is also preferably U-shaped, as best may be seen in FIGS. 6 and 7. While the pairs of openings in lever 44 are cylinderical and dimensioned for receipt of the roll pin in a tight frictional engagement, the openings in the side walls of U-shape body 31 are oversized as compared to pin 46 so as to permit rotation of the lever with respect to body 31. As best may be seen in FIGS. 4 and 5, opening 47 in the side wall of body portion 31 is not only dimensioned for receipt of pin 46, but is additionally an elongated slot 47 which is rearwardly sloped to allow the end of pin 46 to slide along slot 47, as well as pivot during rotation of lever 44. The purpose of providing the opening 47 as an elongated sloped slot will be described more fully hereinafter, but the opening in the other side of body portion 31 preferably is not formed as a slot, but simply an oversized circular opening which will permit rotation of pin 46. Providing a slot in the side of the body opposite slot 47 will tend to cause the teeth in the pinion 49 to bind with the teeth in rack 51. Moreover, if both side walls are formed with elongated slots, pressure on the assembly foot would cause the teeth of the pinion to rise up away from engagement with the teeth in rack 51.

Lever 44 includes a manually engageable handle 48 and pinon 49 in the opposite end thereof proximate pivot pin 46. Pinon 49 is mounted in mating engagement with rack 51 formed on each side of U-shape extensible element 39. Accordingly, rotation of the displacement assembly 42 from the phantom position shown in FIG. 4 to the solid line position shown in FIG. 4 results in displacement of the extensible element 39 to the left so as to increase the pressure against container wall 26 and bind the shoring device between opposed container walls. As will be appreciated, the container walls and body 21 of the shoring device will tend to flex slightly so as to accommodate elongation of the shoring device, and the flexure of the walls acts like a spring that maintains an axial pressure on the shoring device and causes frictional securement thereof between the walls. A lever having a rack and an extensible element with a pinon is broadly shown in U.S. Pat. No. 3,049,328, but the cooperation of the lever-type displacement assembly 42 with latch 43 to enable one-handed manipulation of the latch is not shown in said patent.

In order to latch lever 44 in the solid line position of FIG. 4 so that foot 41 is extended against the cargo container wall, it is preferable to form latch assembly 43 as a downwardly depending finger 52, preferably formed by inwardly punching the side wall of body portion 31. Finger 52 can be inserted through a mating opening 53 in the side of lever 44. Accordingly, lever 44 can be pivoted from the phantom line position of FIG. 4 to the solid line position of FIG. 4 and latch finger 52 inserted through opening 53 to latch the lever in the solid line position.

In order to enable latching of the finger 52 in opening 53, however, lever 44 must not only be pivoted, it must be free for lateral movement. This lateral movement is accommodated by providing elongated slot 47 on the side of body 31 opposite to the side on which finger 52 is formed. The lateral displacement necessary for latching and unlatching of latch 43 can best be understood by comparing FIGS. 2, 4 and 6 (showing the finger in a latched position inside opening 53) with FIGS. 3 and 7 showing latch finger 52 unlatch from lever 44.

Lever 44 pivots about the bottom of slotted opening 46 until opening 53 is proximate finger 52. The handle is then free, by reason of slot 47 to be displaced laterally, as indicated by arrow 54 in FIG. 3. Displacement laterally causes pin 46 to rise to the top of slot 47 and allows the side 56 to pass down over finger 52 until opening 53 is registered with the finger. Displacement of the handle 48 in the direction indicated by arrow 57 in FIG. 2 causes the finger to pass through opening 53, and pin 46 again drops down to the bottom of slot 47. The handle is then latched to body 31 of the foot assembly.

Since the opposite walls 26 exert an axial force on the shoring device, the spring-like action of the walls tends to urge extensible member 39 to the right, as viewed in FIGS. 2–4. This force in turn is transmitted through rack 51 and pinon 49 to lever 44. The result is that the lever is urged upwardly against the latch finger 52. Thus, the latch and lever are formed to automatically secure the extensible element 39 latched in the extended position as a result of the reaction force of the container walls against wall engaging portion 41.

It is possible, therefore, for the user of the foot assembly of the present invention to pivot lever 49 and shift it laterally into engagement with latch finger 52 with one hand. The pressure generated during extension of the foot assembly will automatically secure the lever in the latched position once opening 53 is passed over the latching finger. To unlatch the lever, handle 48 can be gripped and pushed downwardly slightly so as to enable unhooking and lateral shifting of the lever handle to the position of FIG. 3, which will free the handle 48 for rotation and retraction of extensible element 39.

Slot 47 is rearwardly sloped in order to allow for articulation of the pivotal axis of the pivotal mounting pin 46 while still maintaining pinion teeth 49 in meshed engagement with rack teeth 51 on extensible element 39. The sloping of slot 47 avoids binding during articulation of the pivotal axis.

As will be appreciated, it would be possible to employ the lateral shifting or displacement of lever 44 to interlock finger means which was upwardly depending from the side 56 of lever 44 with a recess or opening in the side wall of body 31, but such a structure is somewhat more difficult to latch. A reversal of the finger and recess or opening from that shown in the drawing is, however, contemplated as an alternative embodiment of the latch and lever structure of the present invention.

In order to allow the cargo shoring device of the present invention to be easily positioned next to the cargo, the foot assembly of the present invention is further preferably formed so that extensible element 39 is automatically biased outwardly toward cargo container walls 26. This can be accomplished by mounting biasing structure, such as a compression spring 61, on a spring guide 62 which is hooked at end 63 through an opening in tab 64 in one end of extensible element 39 and is pinned by pin 66 through an eyelet 67 and upstanding flanges 68 in the opposite end of extensible element 39. Mounted by roll pin 69 to the upstanding sides of body 31 is a spring retainer element 71. Spring retainer element 71 has an opening 72 dimensioned for sliding receipt of spring guide 62. As the extensible element is urged inwardly toward body 31, spring 61 is compressed between pin 66 and spring retainer 71. Thus, spring 61 tends to urge foot portion 41 and extensible element 39 to the left until tab 64 abuts against spring retainer member 71. The biased reciprocation of element 39 is guided in part by retainer member 71 and a pair of inwardly protruding tabs or flanges 73 which slideably engage the top surface of rack teeth 51.

As best may be seen in FIG. 4, lever 44 includes a flattened toothless side 74 which will cause pinion means 49 to come out of engagement with rack 51 when the lever is rotated to just beyond the near vertical position shown in phantom in FIG. 4. Once pinion 49 is out of engagement with rack 51, spring 61 controls displacement of element 39 and automatically biases foot portion 41 to the left. This automatic biasing of the extensible element against the container walls allows the shoring device to be placed up against the cargo with variations in the width between walls 26 being adjusted automatically by biasing spring 61, as long as lever 44 is in the position just beyond the vertical. It is preferable to form lever 44 with a laterally projecting stop ear or flange 55 which engages the top of body 31 to limit counter-clockwise rotation of the lever at the position at which pinion 49 is disengaged from rack 51.

Once the bar is positioned between the container walls, lever 44 is rotated until pinion 49 engages rack 51, at which point compression spring 61 no longer affects the force generated in the shoring member between the two walls. As the lever is rotated to the horizontal position of FIG. 4, the pinion positively drives the foot outwardly so as to generate a substantial binding force far in excess of that provided by spring 61. The biasing spring 61, therefore, acts merely to take slack out of the shoring device so as to accommodate minor variations in the distance between opposite walls 26. The details of this automatic slack removal structure are set forth in further detail in commonly owned U.S. Pat. No. 4,396,325 and pending Application Ser. No. 333,043.

The slack removal structure, when combined with a foot assembly which is formed for extension, latching, unlatching and retraction by a single hand, results in a shoring device in which the user can first position the device in close proximity to the cargo, push the cargo back with one hand, reposition the shoring device more tightly against the cargo with the other hand, and secure the shoring device in place with one hand while holding the cargo with the other. Similarly, upon removal of the shoring device, one hand can be used to hold the cargo, while the other is used to unlatch and remove the shoring device.

While the cargo shoring device of FIGS. 1 through 7 includes mounting brackets formed for mounting of the foot assembly to a cargo support member 21 by conventional fasteners, it is an important additional feature of the present invention to provide a foot assembly which can be mounted to support member 21 without the use of conventional fasteners or specialized tools. In FIGS. 8 through 10, an alternative embodiment of the cargo shoring device and the foot assembly for formation of the same is illustrated. In FIG. 8, a quick-mount foot assembly, generally designated 81, is shown mounted to a cargo supporting member or partition, generally designated 82. As best may be seen in FIG. 9, partition 82 can be formed of transversely extending wood frame member 83 to which sheets 84 and 86 are secured. In the preferred form, sheets 84 and 86 are formed of a cardboard material and supported in spaced relation by a wooden or lumber framework 83 and cardboard corrugations (not shown) between the framework. It will be understood, however, that synthetic materials, such as plastic and/or plastic foam cores may provide a suitable cargo support member or partition for the foot assembly of the present invention.

The quick-mount foot assembly includes a body portion 87, preferably constructed as a U-shaped member similar to body portion 31 of the foot assembly of FIGS. 1 through 7. Mounting structure, generally designated 88, formed for removably mounting of the foot assembly to cargo support member or partition 82 is also provided, but the mounting structure is not merely a bracket or flange having fastener receiving openings.

In order to allow quick mounting without the use of fasteners or specialized tools, foot assembly 81 is formed with mounting means including a movable lever 89 having a cargo member engaging portion formed for engagement and securement of the assembly to cargo support member 82. In the form of the invention shown in FIGS. 8 through 10, lever means 89 includes a pair of prongs 91 and 92 which are each formed with sharpened ends so that the ends may be driven into a penetratable cargo support member, such as wooden or plastic or composite wooden and plastic members. Thus, prongs 91 and 92 may be driven through sheet 84 and into penetratable wooden frame member 83. Mounting structural 88 further includes brackets 93 and 94 having flange portions 96 and 97 which engage the back side of partition 82.

Accordingly, as lever 89 is moved from the position of FIG. 9 to the position of FIGS. 8 and 10, prongs 91 and 92 are driven in through sheet 84 and into support frame 83 while bracket portions 96 and 97 secure the foot assembly and support the same during interlocking of the prongs with the cargo support member. It is further preferable to form the quick-mount portion of the foot assembly with latch assembly, generally designated 98, formed to releasably secure lever 89 in a position in which prongs 91 and 92 are engaged with support member 82. Latch 98 may advantageously include a flange 99 having an opening 101 therein dimensioned to receive an ear 102, which protrudes outwardly from the side of lever member 89. Preferably flange 99 includes a lip 103 which will guide the end of the lever 89 down in between flange 99 and the side 104 of the body of the foot assembly.

Under normal use, foot assembly 81 can be rapidly mounted to wooden or synthetic cargo support members, such as partition 82, or a piece of lumber 21, such as a 2×4 (FIG. 1) merely by rotating lever 89 about pivot pin 95. The prong 92 will first engage the cargo support member, and if the lever cannot be rotated into a completely latched position by hand, a simple tool such as a hammer can be used to strike the transversely extending flange 106 of the lever and drive both prongs into the cargo support member. Once the ear 102 is driven down into opening 101, the flange 99 in which opening 101 is formed is resiliently inwardly biased and will snap over the upwardly facing side 107 of ear 102 to lock the lever in the fully engaged position.

In order to remove foot assembly 81 from the cargo support member for repair or replacement of the cargo support member, a simple tool, such as a screwdriver, can be used to pry between lip 103 and lever 89 so as to release ear 102 from the opening 101 and allow rotation of the lever to release the prongs from the cargo support member. It is preferable that lever 89 be formed with a transversely extending tab 108 which will engage sheet 84 so as to limit the pivoting of lever 89. Tab 108 engages the sheet 84 before edge 107 of ear 102 snaps into engagement with notch 101 in the latching flange 99. As the lever is driven downward by hand or by striking the same with a hammer or the like, tab 108 resiliently compresses against the cargo support member and tends to urge edge 107 upwardly against the notch 101 to thus interlock the two tightly together once edge 107 is driven downwardly past the top edge of notch 101.

As best may be seen in FIGS. 9 and 10, it is preferable for mounting bracket 94 to be formed as a socket-like structure including an end-engaging flange portion 109. It is further preferable that at least one of prongs 91 and 92, and preferably prong 92, be formed to in effect draw or cinch the foot assembly down against the end of the cargo support member on which it is mounted. Thus, as lever 89 is rotated, sharpened prong 92 first engages sheet 84 when the prong is almost in a vertical orientation. As the lever is rotated downwardly, prong 92 continues to rotate about pivot point 95 to a position which is sloped toward mounting bracket 94. This has the effect of pulling the mounting bracket back along cargo support member 82 or advancing the cargo support member against end surface 109 of the mounting bracket. In any event, the bracket 94 is urged snugly up against the end of the cargo support member by prong 92.

The second mounting prong 91 enters the cargo support member in a near vertical orientation, although its sloped front surface 111 tends to further tighten the axial fit between the foot assembly and the cargo support member.

As shown in FIG. 8, the foot assembly is formed as an extensible foot assembly preferably having an extensible element which can be extended and latched in position by one hand, as above-described in connection with the foot assembly of FIGS. 1 through 7. The foot assembly of FIGS. 9 and 10, however, is a stationary or fixed type of foot assembly similar to the stationary assembly 23 of FIG. 1. Instead of being mounted to cargo support member 21 by means of fasteners, as is the case for assembly 23, the quick-mount mounting assembly of the present invention is used to mount the foot assembly to the cargo support member.

It is an important feature of the present invention that the same body 87 can be formed for use with either stationary or extensible foot assemblies. When a stationary foot assembly is used, foot portion 112 is mounted to longitudinal member 113 that in turn is slideably received inside U-shaped body 87. In a stationary assembly, however, pin 114 is passed transversely through a set of aligned openings 116 in the member 113 and corresponding set of openings in the sides of body 87. Adjustment of the overall length of the cargo shoring device can be readily accomplished, therefore, by pulling pin 114 and sliding member 13 in body 87 until another pair of openings is aligned with the openings in the body. At that point, pin 87 can be inserted to lock the assembly together. Thus, while the "stationary" foot assembly is not extensible by means of a lever, it does preferably include an element which can be adjusted and locked in a plurality of discrete positions which are spaced apart, for example, by two to three inches (5 to 8 centimeters).

A cargo shoring device having an adjustable stationary foot on one end and an extensible foot assembly on the other can readily be used with cargo containers having slightly different wall spacings. One merely sets the adjustable stationary assembly to approximately the right length, and the difference or slack is taken up by the spring biased extensible foot assembly. The extensible foot assembly is then used to apply the substantial axial load needed to frictionally secure the shoring device between the opposed walls.

In the preferred form, the quick-mount foot assembly includes mounting brackets 93 and 94 which are dimensioned for receipt of either the end of a partition frame member 83 or a piece of lumber such as a 2×4. Such mounting brackets enable use of the foot assembly with either type of cargo supporting member. The ability to quickly mount or demount the foot assembly from lumber beams is particularly important in reducing the cost of cargo shoring devices. Inevitably, beams and partitions will become damaged beyond repair. It is a simple matter to remove the foot assembly of the present invention and mount it on a new cargo shoring member. Moreover, the trucker or railroad carrier can easily saw a 2×4 or other piece of lumber to a length which will accommodate his particular cargo transporting container. Some users will want to brace between opposed walls, while others may wish to brace cargo between the floor and ceiling. Sometimes partitions can even be used in a horizontal orientation, and combinations of partitions and bars or beams may be required for different types of loads. All of these combinations can be readily accommodated by quick-mount foot assemblies that can be used and easily mounted to and removed from a wide variety of members which provide the main body of the shoring device.

The foot assemblies of the present invention are preferably formed from die-cut steel which is punched to provide the various tabs and openings and further bent into a U-shaped cross section so that nested body and foot carrying elements can be secured together.

A process for formation of such foot assemblies has been devised in which roll pins are employed to couple the various components together in a highly efficient assembly process. In connection with the extensible foot assemblies, spring guide 62 is pinned by roll pin 66 through eyelet 67 and the tubular end 76 of foot 41. Spring 62 and spring retention and compression member 71 are then mounted over the other end of guide 62, and the hook 63 is hooked through the opening in tab 64. This completes the sub-assembly of the extensible element. The extensible element can then be positioned in body 31 and lever 44 pinned in place by pin 46, while retention member 71 is pinned in place by pin 69 and mounting lever 89 is pinned by pin 95 to the body of the foot assembly. All three of these pins can be inserted substantially simultaneously from one side of the body, and all three are preferably roll pins which are compressed slightly during the insertion process and allowed to spring back so as to frictionally engage at least one of the body or the levers.

Such a roll pin construction and assembly also makes repair of the foot assemblies relatively easy. If foot 41 is destroyed, one can simply replace rubber member 77 by removing the same from plate 78 or completely replace foot 41 by driving roll pin 66 out and re-pinning a new foot in its place. Similarly, levers having damaged mounting prongs or latches can be removed by driving the roll pin transversely out and replacing the damaged lever. The same is true of displacement lever 42 in the event that pinion teeth 49 are damaged. The ability to easily replace various components of the foot assembly of the present invention, as well as the ability to replace damaged cargo shoring members upon which the foot assemblies are mounted, minimizes the over all repair and maintenance costs of the cargo shoring device of the present invention.

What is claimed is:

1. A cargo shoring device including a central body portion, a foot assembly mounted proximate an end of said central body portion, said foot assembly including foot means formed to engage the wall of a cargo container and mounting means formed for removable mounting of said foot assembly to said central body portion, wherein the improvement in said cargo shoring device is comprised of:
    said mounting means including a movable lever means formed for movement between an engaged position with said central body portion to secure said assembly thereto and a disengaged position for release of said assembly, and means for releasably locking said movable lever means in said engaged position.

2. The cargo shoring device as defined in claim 1 wherein,
    said central body portion is formed with a prong penetratable end, and
    said movable element includes a sharpened prong formed to be driven into said end.

3. The cargo shoring device as defined in claim 2 wherein,
    said central body portion is provided by partition means.

4. The cargo shoring device as defined in claim 2 wherein,
    said central body portion is provided by a piece of lumber.

5. An extensible foot assembly for mounting to a cargo support member to form a shoring device for supporting cargo in a container, said foot assembly including a body formed for mounting to said cargo support member, an extensible element movably mounted to said body and carrying a wall engaging foot portion, manually engageable displacement means including movably mounted lever means formed and coupled for extension and retraction of said extensible element with respect to said body, and latch means formed to releasably latch said extensible element in an extended position, said lever means and said latch means being formed with cooperatively interengageable elements, wherein the improvement in said foot assembly comprises:
    said lever means being formed for movement by only one hand of an operator:
    (i) in a direction effecting extension of said extensible element by said lever means against resistance resulting from engagement with said wall, and
    (ii) in a direction transverse to said direction effecting extension to effect latching of said interengageable elements to latch extensible element in an extended position.

6. The extensible foot assembly as defined in claim 1 wherein,
    said cooperatively interengageable elements are finger means carried by one of said lever means and said latch means and a mating recess formed in a remainder of said lever means and said latch means.

7. The extensible foot assembly as defined in claim 6 wherein,
    said lever means is pivotally mounted and formed to effect extension and retraction of said extensible element upon pivoting thereof, and is formed for displacement in said transverse direction by pivotal mounting means formed for articulation of the pivotal axis of said pivotal mounting means transverse of the direction of pivotal movement.

8. The extensible foot assembly as defined in claim 7 wherein,
    said finger means is formed as a finger extending from said body and said recess is formed as a mating opening formed in said lever means.

9. The extensible foot assembly as defined in claim 5 or claim 8 wherein,
    said foot assembly includes mounting means formed with movable lever means having a support member engaging portion, said lever means being movable between a released position at which said engaging portion is disengaged from said cargo support member and an interengaged position at which said lever means is driven into engagement with said cargo support member to secure said foot assembly thereto.

10. The extensible foot assembly as defined in claim 9 wherein,
    said mounting means includes flange meas formed with a socket dimensioned for receipt of an end of said cargo support member,
    said engaging portion includes a prong suitable to be driven into a penetratable cargo support member,
    said lever means and said prong are formed to progressively urge said end against said flange means as said lever is moved to said interengaged position, and
    latch means formed to releasably secure said lever means in said interengaged position.

11. An extensible foot assembly for mounting to a cargo support member to form a shoring device for supporting cargo in a container, said foot assembly including a body formed for mounting to said cargo support member, an extensible element movably mounted to said body and carrying a wall engaging foot portion, manually engageable pivotally mounted lever formed and coupled for extension and retraction of said extensible element with respect to said body upon rotation of said lever in a plane of rotation, and a latch element formed in said body to engage said lever when rotated to a position extending said extensible element to releasably latch said extensible element in an extended position, wherein the improvement in said foot assembly comprises:

said lever being further mounted for movement into and out of engagement with said latch element by manipulating said lever laterally of said plane of rotation of said lever by one hand of an operator to effect latching and unlatching of said lever.

12. The extensible foot assembly as defined in claim 11 wherein, said body is an elongated body having a U-shaped cross-section with upstanding side portions, said lever is pivotally mounted between said side portion by pivot pin means mounted in opening in said side portion, one of said openings in said side portions being elongated to permit reciprocation of an end of said pivot pin means there along, said lever is further provided with pinion means and is formed with a width dimension less than the distance between said side portions, said extensible element being formed with rack means engaged and mating with said pinion means, said latch element being formed in a said side portion of said body opposite to said side portion having said elongated slot, and being formed at a spaced distance from said openings for said pivot pin means.

13. The extensible foot assembly as defined in claim 12 wherein, said latch element is formed as an outwardly and downwardly depending finger in one of said side portions and said lever and a remainder of said side portion and said lever on aside thereof facing said finger.

14. The extensible foot assembly as defined in claim 11 wherein, said extensible element includes rack means, said lever includes pinion means mating and interengaged with said rack means, and said lever means is further pivotally mounted by pivotal mounting means formed for limited ariticulation of the pivotal axis of said lever laterally to enable said movement of said lever into and out of engagement with said latch element.

15. The extensible foot assembly is defined in claim 14 wherein, said mounting means for said lever includes pivot pin means secured at one end and free for limited guided movement at an opposite along a path having substantially an angular orientation more horizontal than the sides of the teeth on said rack facing away from said wall engaging portion.

16. The extensible foot assembly as defined in claim 14 wherein, said end of said pivotal mounting means includes pivot pin means having first end secured in relatively fixed location and an opposite second end mounted for guided translation, and said latch element formed in a side of said body on the same side of said pivot pin means at said first end.

17. The extensible foot assembly as defined in claim 16 wherein, said body is formed with an opening in one side in which said first end of said pivot pin means is mounted and a slot in an opposite side in which said second end of said pivot pin means is mounted.

18. The extensible foot assembly as defined in claim 15 or claim 17 wherein, said latch element is formed as a protruding finger form said body, and said lever is formed with a mating opening.

19. A quick-mount foot assembly for use in the formation of a cargo support device, said foot assembly including a body carrying a wall engaging foot means, and mounting means formed for removable mounting of said foot assembly to a cargo support member, wherein the improvement in said foot assembly is comprised of:

said mounting means being formed with movable lever means having a engagement portion, said lever means being movable between an engaged position and a released position in which said engagement portion is respectively engaged with and released from said cargo support member, and said mounting means being further formed to cooperate with said engagement portion to secure said foot assembly to said cargo support member upon movement of said lever means to said engaged position.

20. The quick-mount foot assembly as defined in claim 19 wherein, said engagement portion is formed as a prong having a sharp end and movement of said lever means to said engaged position drives said sharp end into said cargo support member.

21. The quick-mount foot assembly as defined in claim 20 wherein, said mounting means includes flange means formed for receipt of an end of said cargo support member therein and formed for support of said end during driving of said sharp end of said prong into said cargo support member.

22. The quick-mount foot assembly as defined in claim 19 wherein, said mounting means includes flange means formed for receipt of an end of said cargo support member therein, and said engagement portion and said lever are formed to urge said cargo support member against said flange means during movement to said engaged position.

23. The quick-mount foot assembly as defined in claim 19 or claim 22 wherein, said mounting means includes latch means releasably securing said lever means in said engaged position.

24. The quick-mount foot assembly as defined in claim 22 wherein, said engagement portion includes a prong having a sharp end suitable to be driven into a penetratable cargo support member.

25. The quick-mount foot assembly as defined in claim 24 wherein, said lever means includes a pair of prongs each having sharp ends and being radially spaced from each other with one prong being positioned proximate the pivot point of said lever means and the remaining prong being positioned proximate a free end of said lever means.

26. The quick-mount foot assembly as defined in claim 24 wherein,
said lever means further includes stop means formed to limit the advance of said sharp end into said wooden cargo support member.

27. The quick-mount foot assembly as defined in claim 19 wherein,
said mounting means includes latch means formed to automatically latch said lever means in said engaged position and formed for release of said latch for movement of said lever means by a screwdriver.

28. The quick-mount foot assembly as defined in claim 19 wherein,
said foot assembly further includes an extensible element on which said wall engaging foot means is carried, and means for securing said extensible element in an extended position.

29. The quick-mount foot assembly as defined in claim 28 wherein,
said means for securing said extensible element in said extended position is formed as a second lever means coupled to said extensible element and formed for displacement thereof, said second lever means being further formed for manipulation by one hand to latch said extensible element in and unlatch said extensible element from said extended position.

* * * * *